March 19, 1929. E. W. SCHELLENTRAGER 1,705,502
CONTAINER VIBRATING MEANS AND METHOD
Filed Aug. 26, 1927
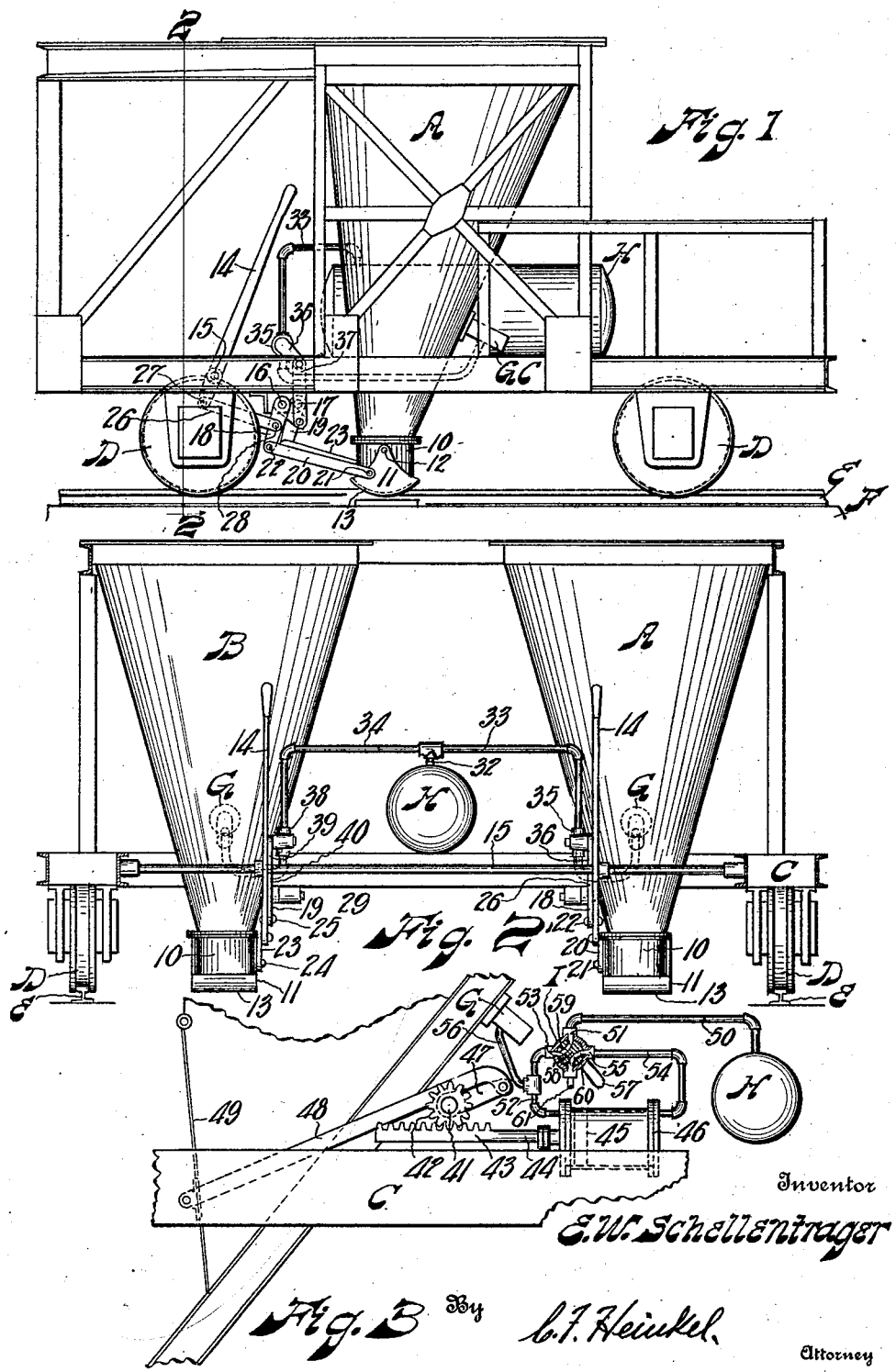
Inventor
E. W. Schellentrager
By C. T. Heinkel
Attorney Patented Mar. 19, 1929.

1,705,502

UNITED STATES PATENT OFFICE.

EUGENE W. SCHELLENTRAGER, OF SHAKER HEIGHTS, OHIO.

CONTAINER-VIBRATING MEANS AND METHOD.

Application filed August 26, 1927. Serial No. 215,623.

My invention relates to means and methods for facilitating the discharge of material from containers.

One of the objects of my invention is a simple and inexpensive means and method to facilitate the discharge of material from containers in the most convenient and economical manner. Other objects, contributory or otherwise, will appear, or become apparent or obvious, or will suggest themselves during the description of the devices shown on the accompanying drawing and the method inherent therein.

In many instances, material must be conveyed from one place to another and containers or hoppers or other similar devices are used for such purposes. In many instances, the walls of the containers must be made sloping or inclined and the material sticks or adheres to the walls and does not discharge readily from the container. Some materials may stick or adhere to the walls of containers when they get wet during transportation or otherwise; other materials may be inherently sticky; other materials may become sticky by heat; other materials may be affected in other manners or by other causes and become sticky thereby; other materials may pack. In such instances, the particles of the material stick together or stick to the walls of the containers and must be moved and loosened from the walls when it is desired to discharge the material from containers.

In a coal car or larry for coke ovens for instance, one or more containers or hoppers are first filled with powdered or granulated coal and the car is then run or conveyed over the top of the oven to the charging openings in the top of the oven. The top of the ovens is always hot and heats the car and the containers thereon and the coal in the containers. This heating causes a tar like substance to be drawn out of the coal particles and this substance causes the coal particles to stick together as well as to stick to the walls of the containers and thereby prevents the coal from discharging readily from the containers and requires some means to facilitate this discharge or to effect this discharge.

Manually operated means, such as pounding and scraping and the like, were priorly used to facilitate this discharge and to clean the walls of containers but such means are inconvenient and expensive. Many other instances could be cited where such sticking occurs.

In order to avoid or eliminate the necessity of manually poking or otherwise assisting the moving of the material in containers or loosening the same from the walls of containers, attempts have been made to slope or incline the walls of tapered containers sufficiently to prevent the same from holding the material in the containers but such procedure is not satisfactory since it results in a very high and/or very long container which is undesirable and inconvenient and expensive and not permissible in many instances and does not prevent the material from sticking to the walls of containers.

The present invention uses, preferably, a pneumatically operated vibrator mechanism in place of the former spring or electrically operated vibrators since the hammer of pneumatically operated vibrators strikes a sharp and decisive and powerful blow against an object and then recedes and thereby leaves the object free to vibrate further. In spring operated vibrators, the hammer remains against the object after the blow is struck and thereby prevents further vibration of the object and new energy must be stored in the spring after each stroke which requires considerable time and thereby reduces the time factor between strokes and consequently, reduces the effectiveness of the vibrations.

In electrically operated vibrators, the magnetic flux necessarily acts through a short air gap and the hammer acts through a short distance and remains on the object unless released by a spring which must be compressed and thereby increases the already large electric current consumption.

I have found that a pneumatic vibrator does move material in a container as well as loosen material on walls of a container much more quickly and much more economically than a mechanical or electric vibrator mechanism.

A further advantageous feature of my invention is that the vibrator is automatically started when the discharge door is opened and stopped when the same is closed. A further advantage is that the vibrator keeps on operating while the door is open without paying further attention to the same but can be stopped while the door is open when so desired.

The present invention eliminates the necessity of all manual means to facilitate the discharge of material from containers and uses a power means to vibrate the walls of containers to move the material in the containers as well as to loosen the material from the walls of containers. The present invention automatically starts and stops the vibration of the walls of containers as the discharge gates of the containers are opened and closed so that the opening and the closing of the gates is all that is necessary to start and to stop the vibration of the walls at the proper time and without unnecessary loss and is performed without any attention by an operator in either one container or simultaneously in a plurality of containers.

In order to illustrate my invention, I have shown the same as embodied in a coal car or larry for a coke oven and in a car having a side opening door or gate but I am aware that my invention can be applied to other cars, or to other containers, or to other devices having containers.

In the accompanying drawing:—

Figure 1 is a side view of a car embodying the features of my invention, designed as a coal charging car for coke ovens, and shows two coal hoppers or containers on the car and a discharge gate on each container and a pneumatically operated vibrator mechanism on each container and a hand lever to individually open and close each of the gates and a valve operated by the movement of the lever to start the operation of the vibrator mechanism when the gate is being opened and stop the operation of the vibrator mechanism when the gate is closed.

Fig. 2 is a vertical section taken in a plane indicated by the line 2—2 in Fig. 1 and shows more clearly the relations of the containers and the vibrators and the gate and vibrator operating mechanism.

Fig. 3 is a side view of a portion of a car embodying the features of my invention and having one container with a hinged side door or gate and a vibrator on the container and a power means for operating the gate and the vibrator simultaneously.

Similar reference characters refer to similar parts throughout the views.

Referring now particularly to the car shown in Figs. 1 and 2 of the drawing:—

The hoppers or containers A and B, each circular cross-sectionally and obliquely conical longitudinally in the present instance, are mounted on the car C which may have any convenient or desirable or necessary appliances and has four wheels D runnable on the track E on the top of the coke oven F.

Each container has the tubular and open ended discharge member 10 on the lower end thereof and also has the discharge gate 11 hinged on the member 10 by means of the pivot pins 12 and having the central or middle portion 13 thereof extending over the open end of the discharge member 10. Each of the gates is arranged so that the portion 13 thereof opens and closes the open end of the member 10 when the gate thereof is swiveled on the pins 12 and thereby retains the material in the container when the gate is so closed and permits the material to discharge out of the container through the member 10 when the gate is opened.

The hand levers 14 are individually fulcrumed on the shaft 15 and the pins 16 and 17 are journaled on the car.

The crank 18 is secured to the pin 16 and the crank 19 is secured to the pin 17. The connector 20 has one end thereof hinged onto the gate on the container A by means of the pivot pin 21 and the other end thereof hinged onto the crank 18 by means of the pivot pin 22. The connector 23 has one end thereof hinged onto the gate on the container B by means of the pivot pin 24 and the other end thereof hinged onto the crank 19 by means of the pivot pin 25.

The connector 26 has one end thereof hinged onto the free end of one of the levers 14 by means of the pivot pin 27 and the other end thereof hinged onto the crank 18 by means of the pivot pin 28. The connector 29 has one end thereof hinged onto the free end of the other one of the levers 14 by means of the pivot pins 30 and the other end thereof hinged onto the crank 19 by means of the pivot pin 31.

When either one of the levers 14 is moved on the fulcrum thereof, the crank and the connector and the gate connected thereon move correspondingly and swivel the corresponding gate on the pivot thereof and thereby moves the portion 13 away from or over the open end of the member 10 and thereby opens and closes the gate and the open end of the member 10.

A vibrator G, in the present instance a pneumatically operated vibrator of any convenient design and operating on the air hammer principle, is fixed onto the wall of each of the containers.

The source of power for the vibrators, the air tank H in the present instance, is mounted on the car and has the discharge pipe 32 bifurcating into two feed pipes 33 and 34 connected to the corresponding ones of the vibrators to supply the same with operating air.

The valve 35 is inserted into the feed pipe 33 and has the crank 36 rotatable with the operating plug thereof. The connector 37 has one end thereof hinged onto the crank 36 and the other end thereof hinged onto the corresponding one of the levers 14. The valve 38 is inserted into the feed pipe 34 and has the crank 39 rotatable with the operating plug thereof. The connector 40 has one end thereof hinged onto the crank 39 and the other end thereof hinged onto the corresponding one of the levers 14.

The cranks on the valves are arranged so that the valves are opened to start the operation of the vibrators when the gates are being opened and to keep the valves open to keep the vibrators in operation while the gates are open and are closed when the gates are closed to stop the operation of the vibrators. With this arrangement, the vibrators operate only when the gates are open and the starting and the stopping of the operation of the vibrators is automatically effected by the opening and the closing of the gates and requires no particular attention.

When the vibrators are in operation, the hammer like pounding of the same vibrates the walls of the containers and thereby moves the material in the containers and loosens material which has adhered to the walls so that the containers are emptied completely through the gates on the lower end thereof and the walls of the containers are cleaned and freed of adherent material at the same time.

In Fig. 3 I have shown a mechanism to operate the side gates and to start and to stop the operation of the vibrator and to operate the vibrator by means of a source of pneumatic power.

In this arrangement, the shaft 41 is journaled on the car and has the pinion 42 rotated by the toothed rack 43 which terminates into the piston rod 44 which has the piston 45 operable in the cylinder 46. The crank 47 is secured to the shaft 41 and rotates with it. The link 48 has one end thereof hinged to the crank 47 and the other end thereof hinged to the gate 49. When this arrangement is intended to be used for two containers and two gates to be operated simultaneously and by one cylinder, the mentioned other end is bifurcated and each of the bifurcated ends is hinged onto the corresponding one of the gates. A similar arrangement can be made when more than two containers or gates are to be operated.

The valve I, a two way valve, has four openings in the case thereof. The pipe 50 extends between the air tank H and the opening 51 in the valve; the pipe 52 extends between one end of the interior of the cylinder 46 and the opening 53 in the valve; the pipe 54 extends between the other end of the interior of the cylinder and the opening 55 in the valve; the pipe 56 extends between the pipe 52 and the vibrator.

The handle 57 is secured to the operating plug 58 of the valve to rotate the same.

When the handle 57 and the ducts through the operating plug are positioned as shown, air enters the cylinder through the pipe 52 and moves the piston and the rack 43 and thereby rotates the pinion 47 in mesh with the rack and thereby rotates the shaft 41 and the crank thereon. This movement of the crank moves the link and thereby moves or opens the gate.

While air is flowing into the cylinder through the pipe 52, air also flows through the pipe 56 and into the vibrator and thereby starts the operation of the vibrator as soon as the gate is being opened and maintains this operation as long as the gate is open or until the valve is closed by means of the handle 57.

When it is desired to close the gate, the operating plug 58 of the valve is rotated until the ducts 59 and 60 are in the positions shown in dotted lines whereupon air enters the cylinder through the pipe 54 and moves the piston and the rack in the opposite direction and thereby closes the gate. While the gate is being closed and while it is closed, the duct 59 is disconnected from the air tank and exhausts air from the cylinder through the pipe 52 and through the exhaust pipe 61.

When the operating plug is rotated part way so that the ducts do not align, the vibrator is stopped while the gate is held open or at least partly open.

I am aware that changes can be made in the structure and in the arrangement of the elements shown and described and that my invention can be applied to or embodied in devices or apparatuses other than the two applications or embodiments shown and described; therefore, without limiting myself to the precise structure and arrangement of elements shown and described nor to the particular applications and embodiments of my invention as shown and described,

I claim:—

1. A container having a discharge gate and means for opening the same and a vibrator mechanism having a starting means operated by said gate opening means when said gate is being opened and while the same is open.

2. A container having a discharge gate and a vibrator mechanism, means for opening and closing said gate, means for operating said vibrator mechanism, and means for starting the operation of said vibrator operating means when said gate is being opened and stopping the operation of said vibrator operating means when said gate is being closed.

3. In combination, a car, a container on said car and having a pneumatically operated discharge gate and a pneumatically operated vibrator mechanism, and means for operating said vibrator mechanism only when said gate is being opened and while the same is open.

4. In combination, a car, a container on said car and having a pneumatically opened and closed gate and a pneumatically operated vibrator mechanism, and means for operating said vibrator mechanism when said gate is being opened and while the same is open and stopping the operation of said vibrator mechanism when said gate is closed.

5. In combination, a car, a source of pneumatic power on said car, a container on said car having a discharge gate operated by said source of power, and a vibrator mechanism operated by said source of power.

6. In combination, a car, a source of pneumatic power on said car, a container on said car having a discharge gate operated by said source of power, and a vibrator mechanism operated by said source of power simultaneously with the operation of said gate.

7. A coal larry including a plurality of coal containers each having a discharge gate and means for opening the same and vibrator mechanism to vibrate the walls of said containers while coal is being discharged from said containers through said gates.

8. A coal larry including a plurality of coal containers each having a movable discharge gate, vibrator mechanism on each of said containers, means for opening and closing said gates, and a one movement means for each of said containers adapted to start the operating of the corresponding one of said vibrator mechanisms and to open the corresponding one of said gates.

9. A method of facilitating the discharge of material from a container having a discharge gate including the vibration of the walls of said container by means of a pneumatically operated vibrator mechanism when said gate is being opened and while the same is open.

10. A container, a pneumatic vibrator for said container, a pneumatically operable discharge gate for said container, and a valve means adapted to simultaneously open said gate and start the operation of said vibrator and to simultaneously close said gate and stop the operation of said vibrator.

11. A container, a vibrator mechanism for said container, a movable discharge gate for said container, and means adapted to simultaneously open said gate and start the operation of said vibrator mechanism and to simultaneously close said gate and stop the operation of said vibrator mechanism.

In testimony of the foregoing I affix my signature.

EUGENE W. SCHELLENTRAGER.